(12) United States Patent
Kakitsuba

(10) Patent No.: US 9,979,846 B2
(45) Date of Patent: May 22, 2018

(54) NON-TRANSITORY COMPUTER READABLE MEDIUMS AND INFORMATION PROCESSING APPARATUS GENERATING PRINT DATA AND PREVIEW DATA

(71) Applicant: BROTHER KOGYO KABUSHIKI KAISHA, Nagoya-shi, Aichi-ken (JP)

(72) Inventor: Ryota Kakitsuba, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 27 days.

(21) Appl. No.: 14/026,638

(22) Filed: Sep. 13, 2013

(65) Prior Publication Data

US 2014/0078539 A1    Mar. 20, 2014

(30) Foreign Application Priority Data

Sep. 20, 2012    (JP) .................. 2012-206669

(51) Int. Cl.
*G06F 3/12*    (2006.01)
*H04N 1/00*    (2006.01)

(52) U.S. Cl.
CPC ....... *H04N 1/00822* (2013.01); *G06F 3/1204* (2013.01); *G06F 3/1208* (2013.01); *G06F 3/1256* (2013.01); *G06F 3/1284* (2013.01); *H04N 1/0044* (2013.01); *H04N 1/00238* (2013.01)

(58) Field of Classification Search
CPC ............. H04N 1/00288; H04N 1/0044; H04N 1/00822; H04N 1/3877; H04N 1/00238; G06F 3/1204; G06F 3/1208; G06F 17/211; G06F 3/1256; G06F 3/1284; G06F 17/212; G06F 3/04845; G06F 2200/1614; G03G 15/231
USPC .................................. 358/1.13, 1.12
See application file for complete search history.

(56) References Cited

U.S. PATENT DOCUMENTS

| 6,034,783 | A | * | 3/2000 | Honma et al. ............... 358/1.16 |
| 7,019,854 | B1 | * | 3/2006 | Sawano ....................... 358/1.15 |
| 8,009,303 | B2 | * | 8/2011 | Kujirai .................. G06F 3/1208 358/1.15 |
| 2005/0206953 | A1 | * | 9/2005 | Kujirai et al. .............. 358/1.15 |

(Continued)

FOREIGN PATENT DOCUMENTS

JP    H08-030410 A    2/1996

*Primary Examiner* — Benny Q Tieu
*Assistant Examiner* — Juan M Guillermety
(74) *Attorney, Agent, or Firm* — Merchant & Gould P.C.

(57) ABSTRACT

There is provided a non-transitory computer readable medium storing a program for a computer of an information processing apparatus, the program causing the computer of the information processing apparatus to carry out: acquiring an image data as a print object; generating a print data, which is an image data for printing, after determining whether or not to change a direction of the acquired image data based on a double-side print setting, and changing the direction of the image data in a case in which the image data is determined to change the direction; generating a preview data, which is an image data for previewing, from the print data after rechanging the once-changed direction of the image data in a case in which the print data is generated after changing the direction of the image data; and displaying the generated preview data onto the information processing apparatus.

6 Claims, 12 Drawing Sheets

(56) References Cited

U.S. PATENT DOCUMENTS

| | | | |
|---|---|---|---|
| 2006/0055953 A1* | 3/2006 | Ishii | H04N 1/33376 358/1.13 |
| 2007/0127961 A1* | 6/2007 | Han et al. | 399/364 |
| 2010/0073693 A1* | 3/2010 | Lee | G06F 3/1208 358/1.2 |
| 2010/0259774 A1* | 10/2010 | Kamisuwa et al. | 358/1.9 |
| 2011/0302490 A1* | 12/2011 | Koarai | 715/274 |
| 2012/0140278 A1* | 6/2012 | Sousa et al. | 358/1.15 |
| 2012/0212763 A1* | 8/2012 | Honma | 358/1.13 |
| 2012/0218581 A1* | 8/2012 | Konji | 358/1.13 |
| 2012/0262747 A1* | 10/2012 | Saito | 358/1.13 |

\* cited by examiner

REVERSE NEEDED

REVERSE NEEDED

REVERSE NOT NEEDED

REVERSE NOT NEEDED

Fig. 11A  Fig. 11B  Fig. 11C
(MANUSCRIPT) (PRINT DATA) (PREVIEW DATA)
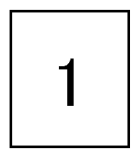
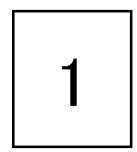
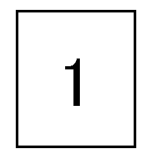
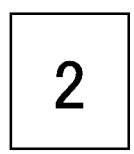
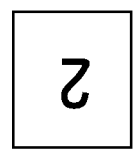
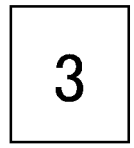
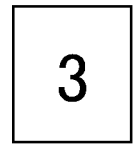
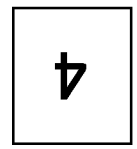

NON-TRANSITORY COMPUTER READABLE MEDIUMS AND INFORMATION PROCESSING APPARATUS GENERATING PRINT DATA AND PREVIEW DATA

CROSS REFERENCE TO RELATED APPLICATION

The present application claims priority from Japanese Patent Application No. 2012-206669, filed on Sep. 20, 2012, the disclosure of which is incorporated herein by reference in its entirety.

BACKGROUND OF THE INVENTION

Field of the Invention

The present invention relates to a computer readable medium storing a computer program, and an information processing apparatus. In more detail, it relates to a computer readable media storing a computer program, and an information processing apparatus, which have a preview function of displaying preview data, i.e., image data of images to be printed on printing paper.

Description of the Related Art

Conventionally, the preview function has been known as displaying preview data on a preview screen before a printing apparatus carries out printing. For example, there is known a technique by which an information processing apparatus sends a preview command to a printing apparatus after sending a print data to the printing apparatus; on receiving the preview command, the printing apparatus sends back the print data which has been developed into a dot image to the information processing apparatus; then, the information processing apparatus displays the developed print data sent back.

SUMMARY OF THE INVENTION

However, there is such a problem as follows in the above conventional technique. That is, there are occasions where the printing direction of print data is changed based on the device configuration and print settings of the printing apparatus. For example, when carrying out double-side printing, it is necessary to vertically flip or reverse the print data to be printed on one side of a sheet according to the double-side print setting. In such case, if the developed print data is displayed in preview as it is, then the vertically reversed print data is displayed, which is difficult for a user to recognize the printing result.

The present teaching is made for solving the above problem in the conventional technique. That is, an object of the present teaching is to provide a computer readable medium storing a computer program, and an information processing apparatus to carry out a preview display whereby it is easy for a user to recognize the printing result.

According to a first aspect of the present teaching, there is provided a non-transitory computer readable medium storing a program for a computer of an information processing apparatus, the program being configured to cause the computer of the information processing apparatus to carry out:

acquiring an image data as a print object;

generating a print data, which is an image data for printing, after determining whether or not to change a direction of the acquired image data based on a double-side print setting, and changing the direction of the image data in a case in which the image data is determined to change the direction thereof;

generating a preview data, which is an image data for previewing, from the print data after rechanging the once-changed direction of the image data in a case in which the print data is generated after changing the direction of the image data; and displaying the generated preview data onto the information processing apparatus.

The program disclosed in this description determines whether or not to change the direction of the image data according to the double-side print setting. The double-side print setting includes not only an instruction of whether or not to carry out double-side printing but also, for example, information of printing direction and arrangement of binding edge. Then, this program generates the print data after changing the direction of the image data when it is determined to change the direction. The direction of the image data may be changed in terms of the width direction of the image, or the height direction of the image, or the both directions. Further, this program generates the preview data based on the picture image of the image data after rechanging the direction of the image data when the print data is generated after changing the direction of the image data.

That is, the program disclosed in this description generates the preview data after rechanging the direction of the image data so as to restore the picture image before being changed when the print data is generated after changing the direction of the image data. By virtue of this, the image directions are coordinated in preview display. Therefore, it becomes easy for a user to recognize the printing result.

According to a second aspect of the present teaching, there is provided an information processing apparatus including: a display; and a controller which is configured to:

acquire an image data as print object;

generate a print data, which is an image data for printing, after determining whether or not to change a direction of the acquired image data based a double-side print setting, and changing the direction of the image data in a case in which the image data is determined to change the direction thereof;

generate a preview data, which is an image data for previewing, from the print data after rechanging the once-changed direction of the image data in a case in which the print data is generated after changing the direction of the image data; and display the generated preview data onto the display.

According to the present teaching, there are realized a non-transitory computer readable medium storing a computer program, and an information processing apparatus to carry out a preview display whereby it is easy for a user to recognize the printing result.

BRIEF DESCRIPTION OF THE DRAWINGS

FIGS. 11A to 11C show a manuscript, each picture image of the print data, and the preview data, respectively.

DESCRIPTION OF THE PREFERRED EMBODIMENT

Referring to the accompanying drawings, detailed explanations with be given below about a preferred embodiment which embodies a computer readable medium and an information processing apparatus in accordance with the present teaching.

[Configuration of a Printing System]

Figure 1:
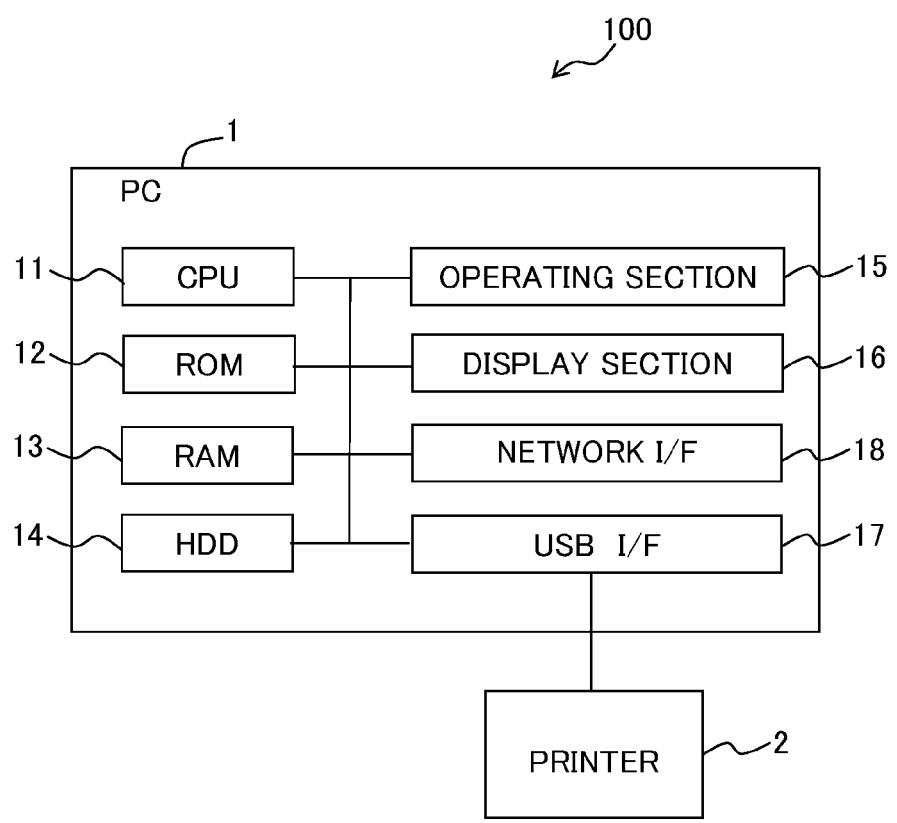
FIG. 1 is a block diagram showing a configuration of a printing system in accordance with an embodiment of the present teaching.

As shown in FIG. 1, a printing system 100 of this embodiment includes a printer 2 which is an example of the printing apparatus, a PC 1 which is an example of the information processing apparatus, and which controls the printer 2. In the printing system 100, the PC 1 and the printer 2 are connected via a USB cable.

Further, the printer and the PC constituting the printing system 100 are not limited to being respectively one printer and one PC, but may include respectively a plurality of printers and a plurality of PCs. Further, the PC 1 and the printer 2 are not limited to being connected by a USB cable, but may be connected by any other serial communication cable, parallel communication cable, LAN cable and, furthermore, wireless communication path such as wireless LAN or the like.

The PC 1 has a CPU 11 which is an example of the control portion, and which carries out various processes, a ROM 12 which stores a startup processing program (also referred to as a BIOS) and the like to be executed by the CPU 11 at time of starting up the PC 1, a RAM 13 which is used as a temporary storage area when the CPU 11 carries out the various processes, and a hard disk drive 14 (also referred to as a HDD 14) which stores various programs and data.

Further, the PC 1 has an operating section 15 including a keyboard, a mouse and the like, a display portion 16 which is an example of the display portion and which includes a liquid crystal display and the like, a USB interface 17, and a network interface 18.

Figure 2:
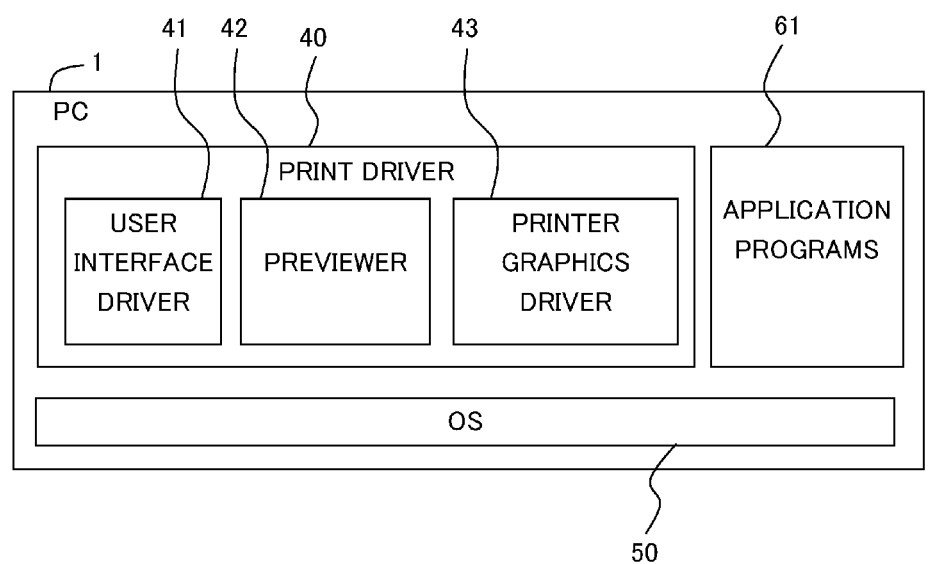
FIG. 2 is a block diagram showing a configuration of a computer program installed in a personal computer.

As shown in FIG. 2, the HDD 14 of the PC 1 has stored an operating system 50 (also referred to as an OS 50); application programs 61 such as word-processing software, drawing software, spreadsheet software, photographic data editing software, and the like; and a printer driver 40 for controlling the printer 2 which is an example of the program. Further, these various programs may either be installed directly from a storage medium storing the various programs such as a CD-ROM or the like, or be downloaded and installed from a server storing the various programs on a network.

The application programs 61 installed in the PC 1 are provided with a function of outputting a print command to the printer driver 40 and, by this function, the image data of a manuscript image is transmitted to the printer driver 40.

Based on the image data transmitted from the application programs 61, the printer driver 40 generates a print data in PDL format, which is necessary for the printer 2 to print.

The print data generated by the printer driver 40 is sent to the printer 2 via the USB interface 17. The printer 2 receives the print data, and prints an image of the print data on a sheet of printing paper.

The printer 2 may have a function of forming images on the printing paper, and may adopt any of such image formation methods as an electrophotographic method, ink-jet method, or any other ordinary image formation method. Further, the function may either be capable of forming both color images and black-and-white images, or be capable of forming only black-and-white images.

Further, the printer driver 40 of this embodiment has a preview function of generating a preview data, which is the picture image data to be printed on the printing paper, before sending the print data, and displaying the preview data. Further, the printer driver 40 of this embodiment has a function of carrying out a setting of whether or not to enable the preview function.

In particular, in the case of displaying a preview data, the printer driver 40 of this embodiment activates a previewer 42 before sending the print data to the printer 2. Then, the preview data is displayed on a preview screen of the previewer 42. On the other hand, in the case of not displaying the preview data, the printer driver 40 sends the print data to the printer 2 without activating the previewer 42. The detail of the printer driver 40 will be described later.

Further, the preview function in the present description is not a function possessed by the application programs 61, but is a function possessed by the printer driver 40 as described above. When generating a print data, the printer driver 40 may carry out some aggregate printing such as 2 in 1 or the like, or some processing such as assigning water mark or the like; thus, any processing carried out by the printer driver 40 is not reflected in the preview by the application programs 61. On the other hand, in the preview by the printer driver 40, it is possible to display the preview data which has reflected the processing carried out by the printer driver 40. Therefore, the preview by the printer driver 40 has such an advantage as capable of more correctly displaying the picture image to be printed on the printing paper than the preview by the application programs 61.

<Configuration of the Printer Driver>

Next, referring to FIG. 2, explanations will be given about a configuration of the printer driver 40. Further, suppose that a Microsoft Windows (registered trademark) is installed in the PC 1 as the OS 50. Further, this is merely an exemplification, and it is possible to adopt any operating system as the OS 50 as necessary.

The printer driver 40 has a user interface driver 41 which enables a user to input various settings for a print job, the previewer 42 which displays print images on the display portion 16, and a printer graphics driver 43 which generates print data for printing and generates preview data for previewing.

Figure 3:
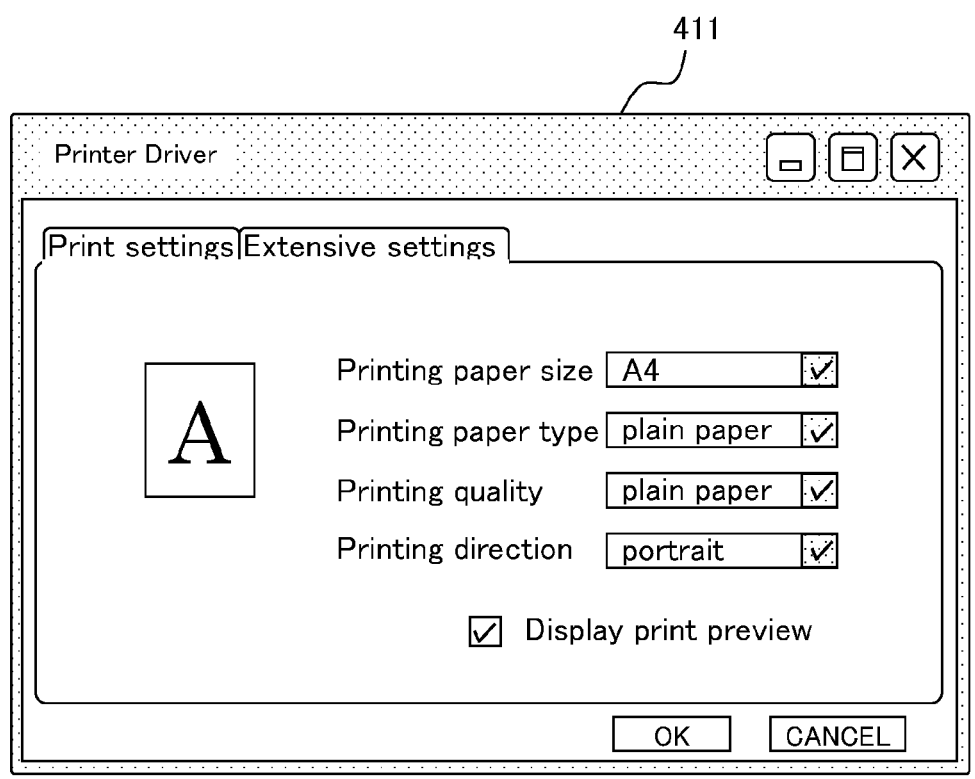
FIG. 3 shows a configuration of a print settings screen.

In particular, the user interface driver 41 provides a print settings screen 411 as shown in FIG. 3 to let the user set various properties for printing. On the print settings screen 411, it is possible to carry out not only ordinary print settings such as printing paper size, printing paper type, printing quality, printing direction and the like, but also a setting of whether or not to display a print preview.

Hereinbelow, "ON" refers to the case in which a checkbox is checked, while "OFF" refers to the case in which a checkbox is not checked. If the setting for displaying a print preview is checked, then the printer driver 40 activates the previewer 42 before sending the print data to the printer 2, and displays the preview data on the preview screen. Then, it accepts an instruction of whether or not to print the same on the preview screen and, if an instruction is inputted to prescribe performance of the printing, then the print data is sent from the previewer 42 to the printer 2. On the other hand, if the setting for displaying the print preview is OFF, then the print data is sent to the printer 2 without activating the previewer 42.

Further, the user interface driver 41 has a function of activating the previewer 42 if the setting for displaying the print preview is ON. The timing of activating the previewer 42 will be described later.

Figure 4:
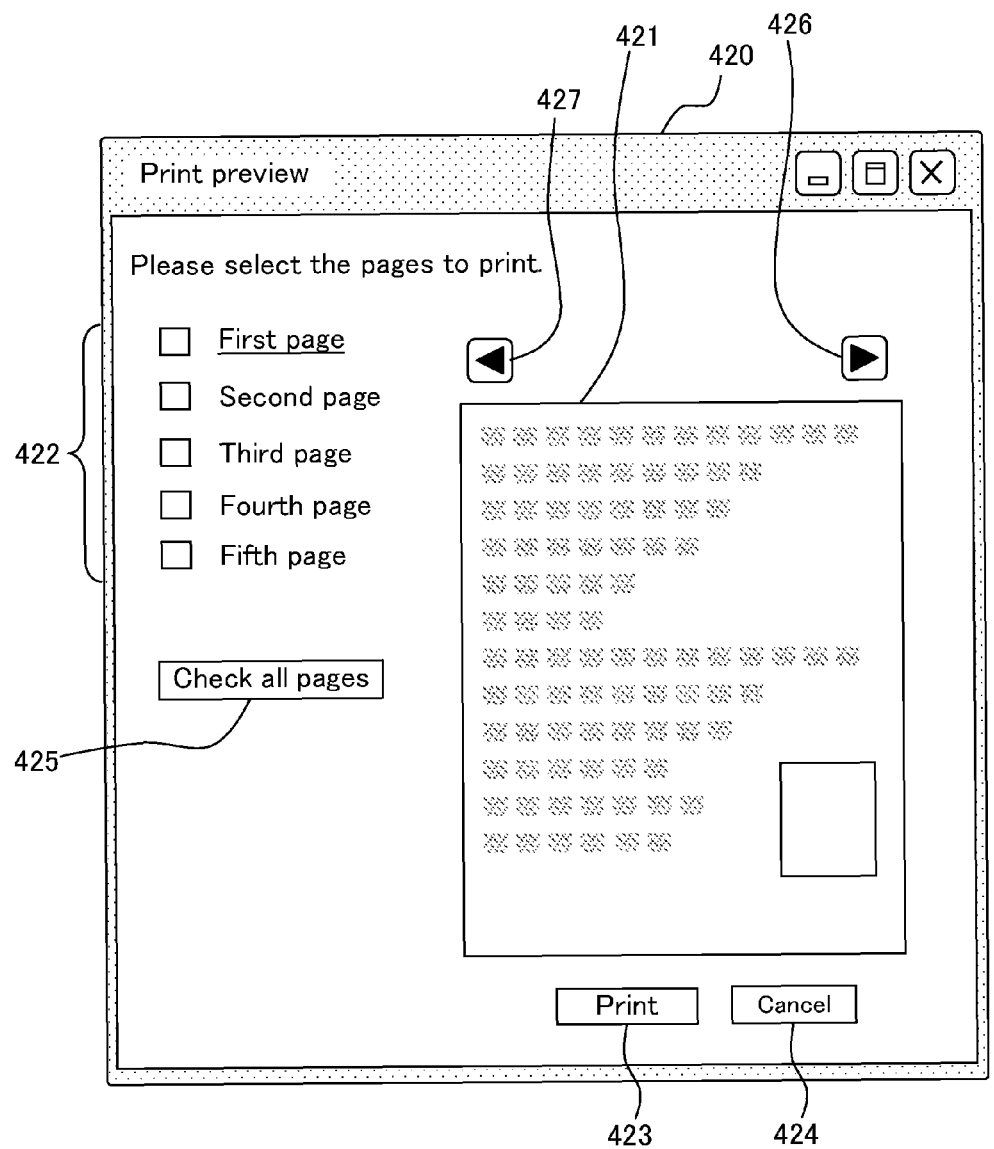
FIG. 4 shows a configuration of a preview screen.

The previewer 42 displays such a preview screen 420 as shown in FIG. 4. The preview screen 420 has an image area 421 to display preview data of one page which is equivalent to one side of the printing paper, a page selection checkbox set 422 to set each page as print object or not, a print execution button 423 to accept the printing instruction for the pages set as print object, a cancel button 424 to cancel the print job, an all-page check button 425 to set, as print object, all the pages listed in the page selection checkbox set 422, a next-page button 426 to accept the instruction for displaying the preview data of the next page in the image area 421, and a previous-page button 427 to accept the instruction for displaying the preview data of the previous page in the image area 421.

In the page selection checkbox set 422, an underline is displayed to the number of the page being displayed in the image area 421. By virtue of this, the user can perceive the number of the page being displayed in the image area 421. Further, because the page selection checkbox set 422 has displayed as many checkboxes as the number of the generated preview data, the user can perceive the total number of the pages constituting the print job. Further, when the all-page check button 425 is pressed, then the checkboxes of every page listed in the page selection checkbox set 422 will all come into the checked status. When the print execution button 423 or the cancel button 424 is pressed, then the previewer 42 will be ended.

The printer graphics driver 43 carries out a processing treatment to the image data as print object, a process of generating preview data in printing paper unit based on the image data in which the processing treatment is reflected, and a process of generating print data in printing paper unit based on the image data in which the processing treatment is reflected. Further, for double-side printing, in addition to the process of generating preview data in printing paper unit, it also carries out a process of generating preview data in printing paper page unit. The processing treatment corresponds to, for example, composition of water mark, header, footer and the like, ratio change for expansion, contraction and the like, image rotation, aggregation by 2 in 1, 4 in 1 and the like.

The file format of preview data may be any file format displayable by the previewer 42. In this embodiment, it is supposed to be the format of a compressed file such as a JPEG file for example, which has compressed a file in bitmap format. Further, the file format of preview data may also be that of an uncompressed bitmap file. Further, the file format of print data may be any file format printable by the printer 2. In this embodiment, it is supposed to be the format of a PDL file.

<Configuration of the Printer>

Next, referring to FIG. 5, a configuration of the printer 2 will be explained. The printer 2 of this embodiment has a processing portion 20 which forms images based on print data and prints those images on the printing paper, a paper feed cassette 31 which contains the unprinted printing paper, a paper discharge tray 32 which loads the printed printing paper, a paper feed roller 35 which picks up the printing paper from the paper feed cassette 31 sheet by sheet, resistance rollers 36 which transport the printing paper to the processing portion 20, and paper discharge rollers 37 which discharge the printing paper to the paper discharge tray 32. In addition, a number of printing paper transport rollers are provided in the printing paper path.

Figure 5:
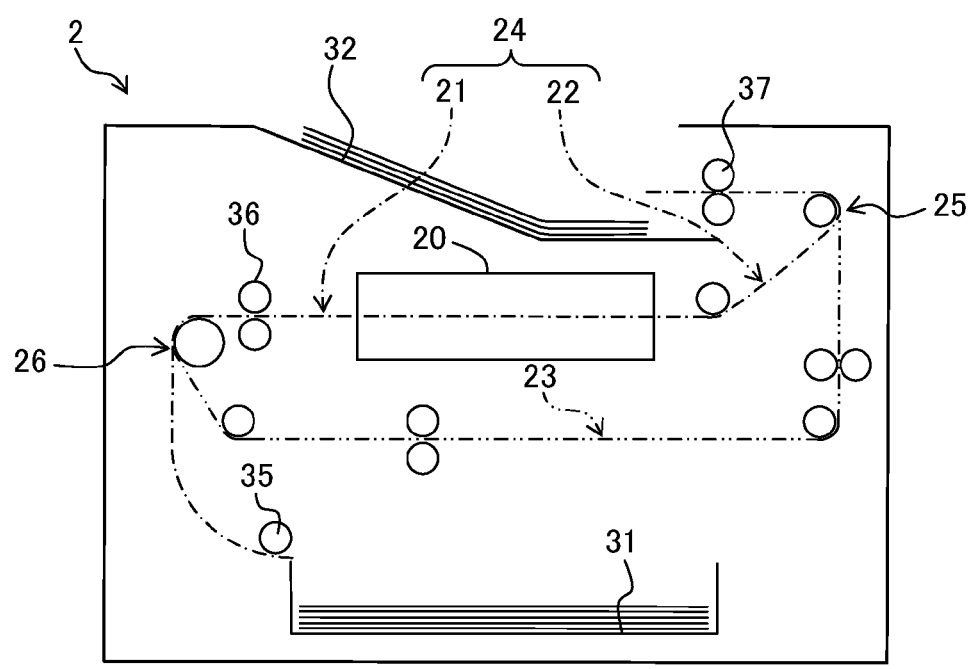
FIG. 5 shows a configuration of a printer.

Further, the printer 2 is provided therein with an approximately U-shaped paper feed path 21 which guides the printing paper contained in the paper feed cassette 31 situated at the bottom, to the processing portion 20 via the paper feed roller 35 and the resistance rollers 36, and an approximately U-shaped paper discharge path 22 which guides the printing paper from the processing portion 20 to the paper discharge tray 32 via the paper discharge rollers 37, so as to form an approximately S-shaped printing path 24 including the paper feed path 21 and the paper discharge path 22 (shown with the one-dot chain line in FIG. 5).

The printer 2 of this embodiment takes the printing paper loaded in the paper feed cassette 31 sheet by sheet into the paper feed path 21, transports the printing paper to the processing portion 20, and prints images on the printing paper. Then, it guides the printed printing paper to the paper discharge rollers 37 via the paper discharge path 22, and lets the paper discharge rollers 37 discharge the same.

Further, the printer 2 is provided therein with a transport mechanism for carrying out double-side printing. That is, the printer 2 is provided therein with a reversing path 23 (shown with the two-dot chain line in FIG. 5) for reversing the front and back sides of the printing paper and resending the same to the processing portion 20, so as to carry out printing, too, on the other side of the printing paper, on the one side of which printing has been carried out.

The reversing path 23 branches from the paper discharge path 22 at a branch point 25 positioned on the downstream side from the processing portion 20 and on the upstream side to the paper discharge rollers 37 in the transport direction of the printing paper. Then, the reversing path 23 is formed between the processing portion 20 and the paper feed cassette 31 from the branch point 25, and joins the printing path 24 at a junction point 26 positioned on the downstream side from the paper feed roller 35 and on the upstream side to the resistance rollers 36 in the paper feed path 21. That is, the printing path 24 and the reversing path 23 are formed as the printing paper path in the printer 2.

In particular, when the printer 2 carries out double-side printing, the printing paper is transported according to such a procedure as follows. First, the printing paper fed from the paper feed cassette 31 is guided to the processing portion 20 via the paper feed path 21 to undertake printing on the back side which is the first page of the printing paper. Thereafter, the printing paper finished with the back-side printing is transported up to the paper discharge rollers 37 via the paper discharge path 22. After the rear edge of the printing paper passes the branch point 25, the paper discharge rollers 37 once stop rotating with the printing paper being sandwiched. Then, the paper discharge rollers 37 switch their rotating directions to reverse the transport direction of the printing paper. Then, the printing paper, of which transport direction has been reversed, is transported into the reversing path 23 via the branch point 25. Thereafter, this printing paper is returned into the paper feed path 21 via the junction point 26 on the upstream side to the processing portion 20. By virtue of this, the front and back sides of the printing paper are reversed. Then, printing is undertaken on the front side, i.e. the second page, and the printing paper finished with the front-side printing, i.e. the printing paper finished with double-side printing, is discharged via the paper discharge rollers 37.

When the printer 2 carries out double-side printing, the paper discharge rollers 37 change the transport direction of the printing paper finished with the back-side printing by 180 degrees as described above. That is, the front edge of the back side of the printing paper becomes the rear edge of the front side. Therefore, when images are printed not in opposite directions between the back side and the front side, then the images printed on the front side and the back side of one sheet of the printing paper are not be coordinated in direction. Hence, in order to coordinate the directions of the images on the front side and the back side of one sheet of the printing paper, the printer 2 first reverses the direction of images on even-numbered pages, which correspond to the back sides, and then carries out printing.

Figure 6A:
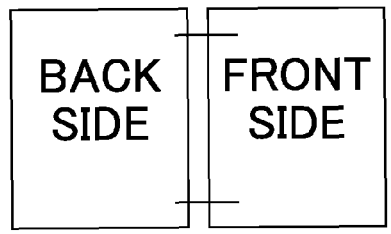
FIGS. 6A to 6D show print images with different settings of binding edge and printing direction for double-side printing.
Figure 6B:
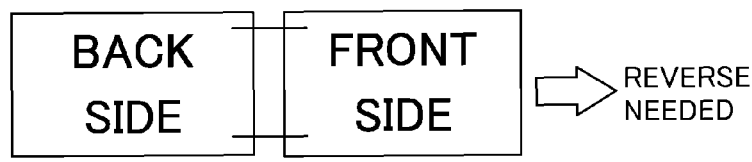
Figure 6C:
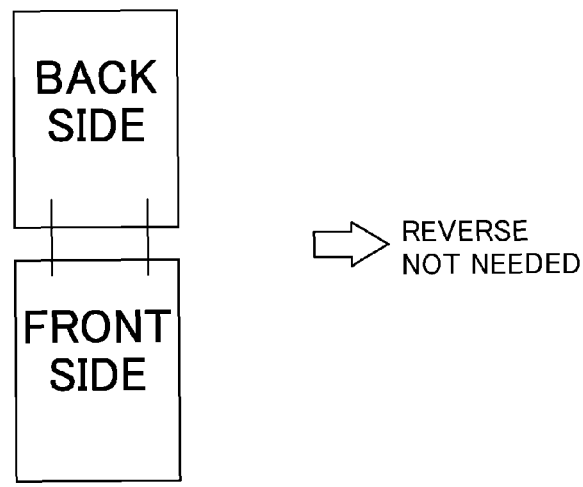
Figure 6D:
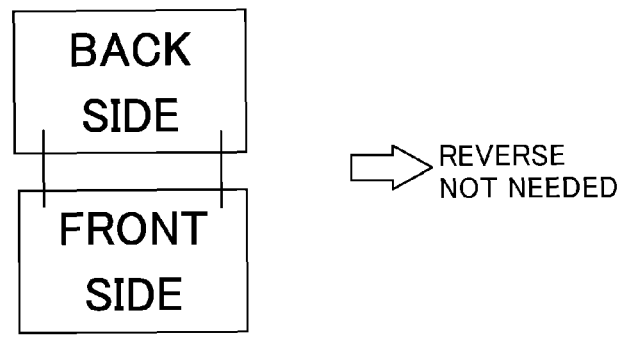

However, in double-side printing, depending on the settings of binding edge and printing direction (e.g. portrait and landscape), there are also some cases in which images are printed in mutually opposite direction without coordinating the directions of the images on the front and back sides of one sheet of the printing paper. FIGS. 6A to 6D show print images with different settings of binding edge and printing direction. FIG. 6A shows print images of a portrait print with long-edge binding. In such a case, it is necessary to coordinate the directions of the images on the front and the back sides of one sheet of the printing paper, and thus image reverse is needed. FIG. 6B shows print images of a landscape print with short-edge binding. In such a case, too, it is necessary to coordinate the directions of the images on the front and back sides of one sheet of the printing paper, and thus image reverse is needed. On the other hand, FIG. 6C shows print images of a portrait print with short-edge binding. In such a case, because of the opposite directions of the images on the front and back sides of one sheet of the printing paper, image reverse is not needed. FIG. 6D shows print images of a landscape print with long-edge binding. In such a case, too, because of the opposite directions of the images on the front and back sides of one sheet of the printing paper, image reverse is not needed.

<Printing Procedure>

Next, explanations will be given about a printing procedure of the printing system 100 of this embodiment. As described earlier, the printing system 100 of this embodiment adopts the method of carrying out preview display before carrying out printing which is referred to as the previewing and printing method, and the method of carrying out printing without carrying out preview display which is referred to as the direct printing method. Hereinbelow, these two methods will be explained separately. Further, the printing system 100 carries out printing by a RAW spool method.

<Direct Printing Method>

Figure 7:
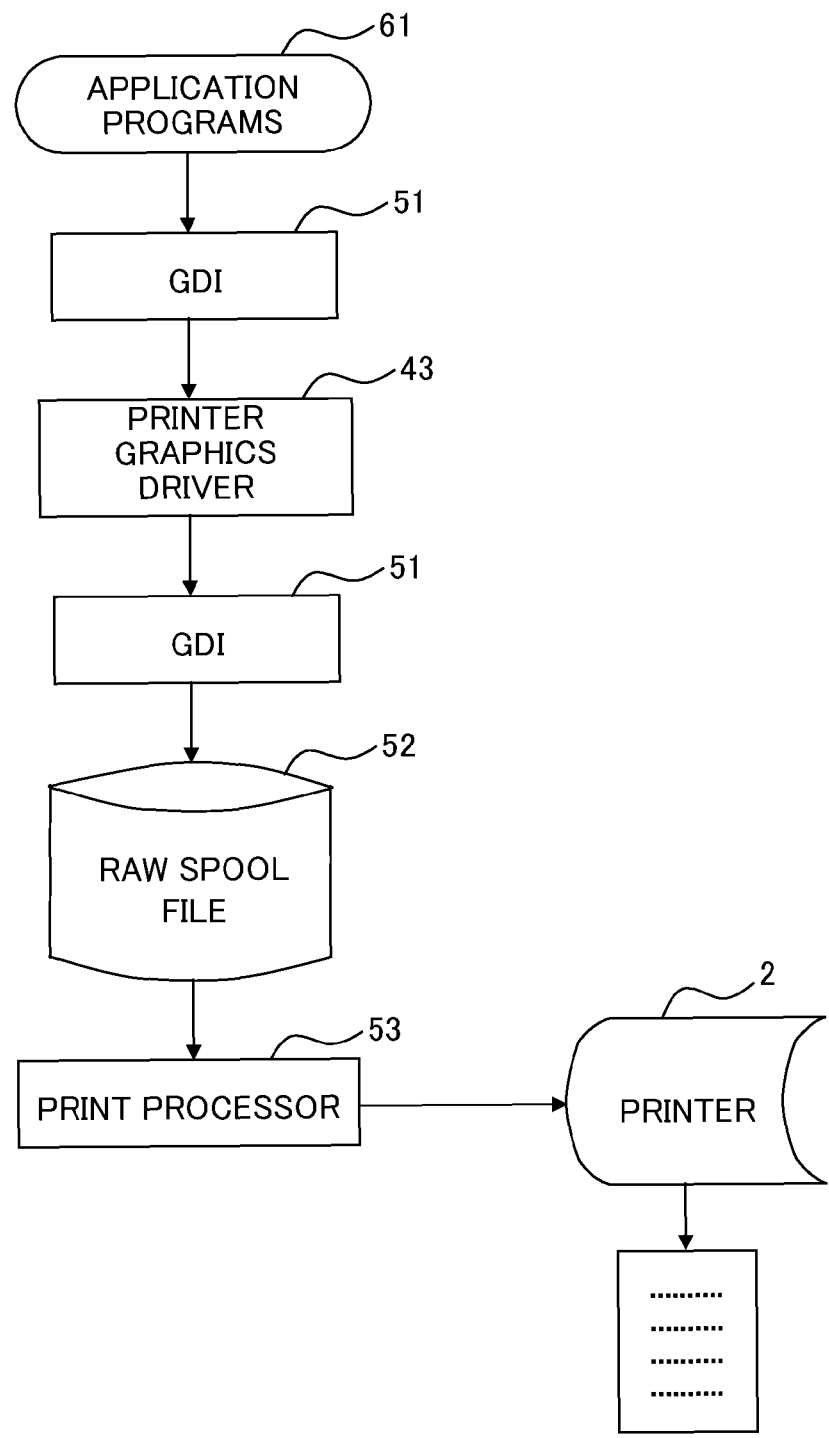
FIG. 7 is a block diagram showing a printing procedure with a direct printing method.

To begin with, referring to the block diagram of FIG. 7, an explanation will be given about the direct printing method whereby printing is carried out without carrying out preview display. Further, while there are two GDIs 51 in FIG. 7 to serve the purpose of simplifying the explanation, they are the same module in reality.

The GDI 51 is a module which carries out control of an output device such as a printer, a display or the like, and is provided as part of the OS 50. The GDI 51 accepts a command from the application programs 61, converts the command into a data (a bitmap data in this embodiment) interpretable by a device driver (the printer driver 40 in this embodiment), and turns over the converted data to the device driver.

Similar to the GDI 51, a print processor 53 is also provided as part of the OS 50. The print processor 53 is a module which has a function of outputting print data to the printer 2, and a function of instructing the printer driver 40 to generate print data.

When carrying out printing, first, the application programs 61 accept a printing instruction from the user, and output a printing start notification. Then, the GDI 51 as part of the OS 50 accepts the printing start notification from the application programs 61, and starts acquisition of image data from the application programs 61.

On starting acquisition of image data, the GDI 51 converts the image data into bitmap data and, furthermore, issues a draw command to the printer graphics driver 43. On accepting the draw command, the printer graphics driver 43 acquires the converted image data from the GDI 51, and generates a print data for the printer 2 based on the image data. Further, when generating the print data, it carries out a processing treatment as necessary to the image data such as image reverse and the like. After generating the print data, it responds to the GDI 51 to report the finishing of generation. The GDI 51 stores the generated print data into a RAW spool file 52 prepared by the OS 50.

When the print data is stored into the RAW spool file 52, then the print processor 53 is activated to send, to the printer 2, the print data stored in the RAW spool file 52. Having received the print data, the printer 2 carries out printing based on the print data.

<Previewing and Printing Method>

Figure 8:
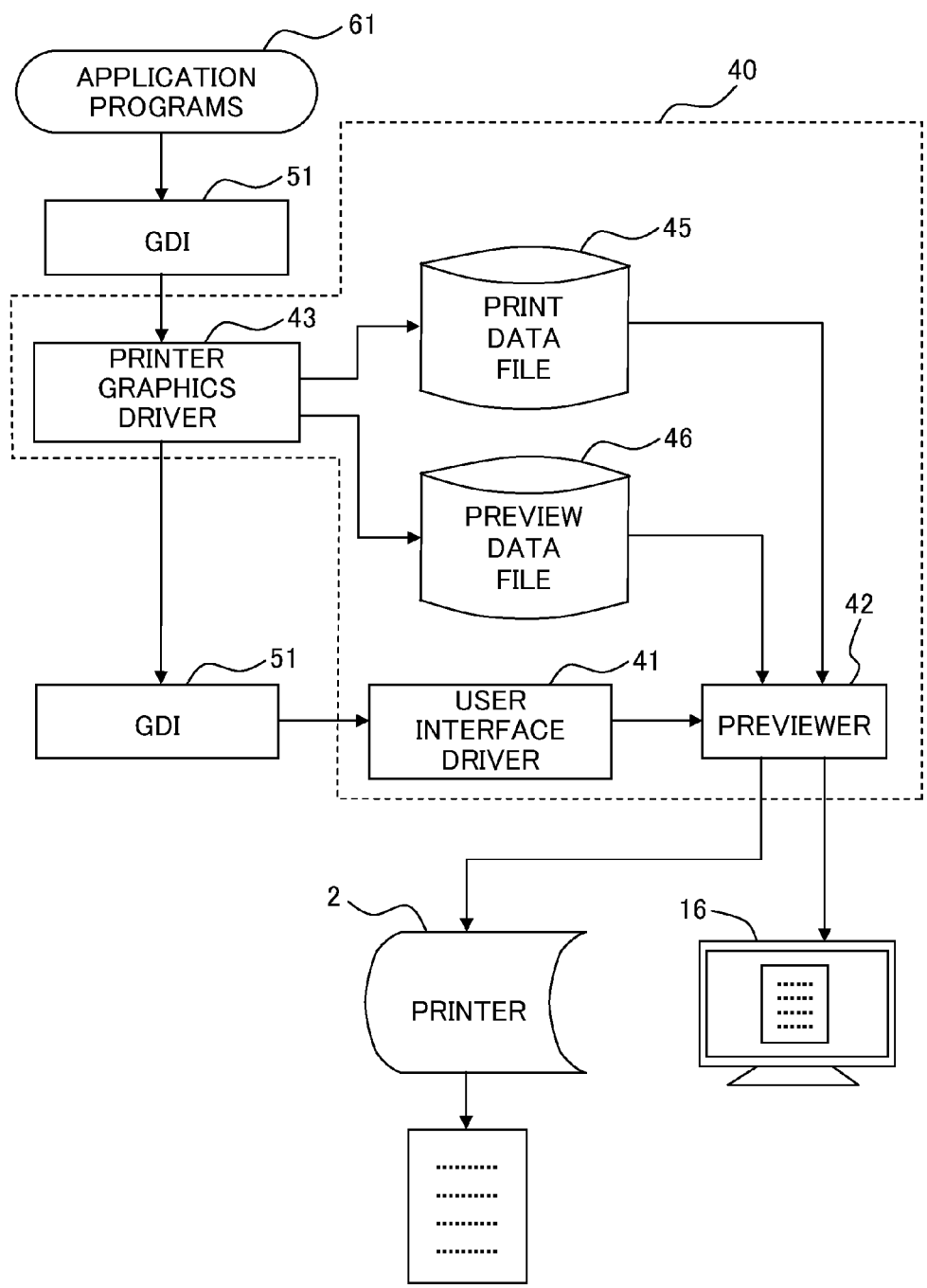
FIG. 8 is a block diagram showing a printing procedure with a previewing and printing method.

Next, referring to the block diagram of FIG. 8, the previewing and printing method will be explained. Further, while there are also two GDIs 51 in FIG. 8 to serve the purpose of simplifying the explanation, they are respectively the same module in reality.

When carrying out previewing and printing, first, the application programs 61 accept a printing instruction from the user, and output a printing start notification. Then, the GDI 51 accepts the printing start notification from the application programs 61.

After accepting the printing start notification, the GDI 51 acquires image data from the application programs 61. Then, the GDI 51 converts the acquired image data into bitmap data and, furthermore, outputs a draw command to the printer graphics driver 43. After outputting the draw command, the GDI 51 stands by until the printer graphics driver 43 gives a response.

On accepting the draw command, the printer graphics driver 43 acquires the image data converted by the GDI 51, carries out a processing treatment as necessary to the image data such as image reverse and the like and, furthermore, based on the image data, generates a preview data for the previewer 42 and a print data for the printer 2 In this embodiment, the preview data for the previewer 42 is JPEG data, and the print data for the printer 2 is PDL data. That is, it generates two types of data from the image data: the preview data and the print data. The print data is stored into a print data file 45, while the preview data is stored into a preview data file 46. Further, the print data file 45 and preview data file 46 have stored information which associates the page number with the storage place of the data of each page. The print data file 45 and preview data file 46 are files prepared by the printer driver 40, and thus differ from the RAW spool file 52 prepared by the OS 50. After finishing generation of the preview data and print data, the printer graphics driver 43 responds to the GDI 51 to report the finishing.

Whenever an image data is accepted, the printer driver 40 carries out generation of the preview data and print data for each sheet of the printing paper, as described earlier. Further, in case of the double-side printing, the printing driver 40 carries out generation of the preview data and print data for each side of the respective sheet of the printing paper. Then the printer driver 40 repeats the generation until the process is finished with the image data of the last page.

When finished with turning over the image data of the last page, the application programs 61 output a printing end notification. On accepting the printing end notification from the application programs 61, the GDI 51 issues a printing end event to the user interface driver 41.

On accepting the printing end event, the user interface driver 41 activates the previewer 42. Further, after or at the same time of activating the previewer 42, the user interface driver 41 causes the previewer 42 to read out all the preview data generated by the printer graphics driver 43 from the preview data file 46, and to display the preview data of the first page in the previewer 42.

Afterwards, the previewer 42 accepts the printing instruction or the cancel instruction from the user. On accepting the printing instruction from the user, the previewer 42 reads out the print data from the print data file 45, corresponding to the pages selected by the page selection checkbox set 422 as print object from the print data stored in the print data file 45, and sends the print data to the printer 2. That is, when the setting for displaying the print preview is ON, then according to the instruction from the previewer 42, the print data stored in the print data file 45 is sent to the printer 2.

Further, even when displaying the print preview, because there is no difference in using the RAW spool method, the OS 50 still generates the RAW spool file 52. However, this RAW spool file 52 does not store the print data. Therefore, as a result, no print data is sent from the RAW spool file 52.

<Printing Process (First Configuration)>

Figure 9:
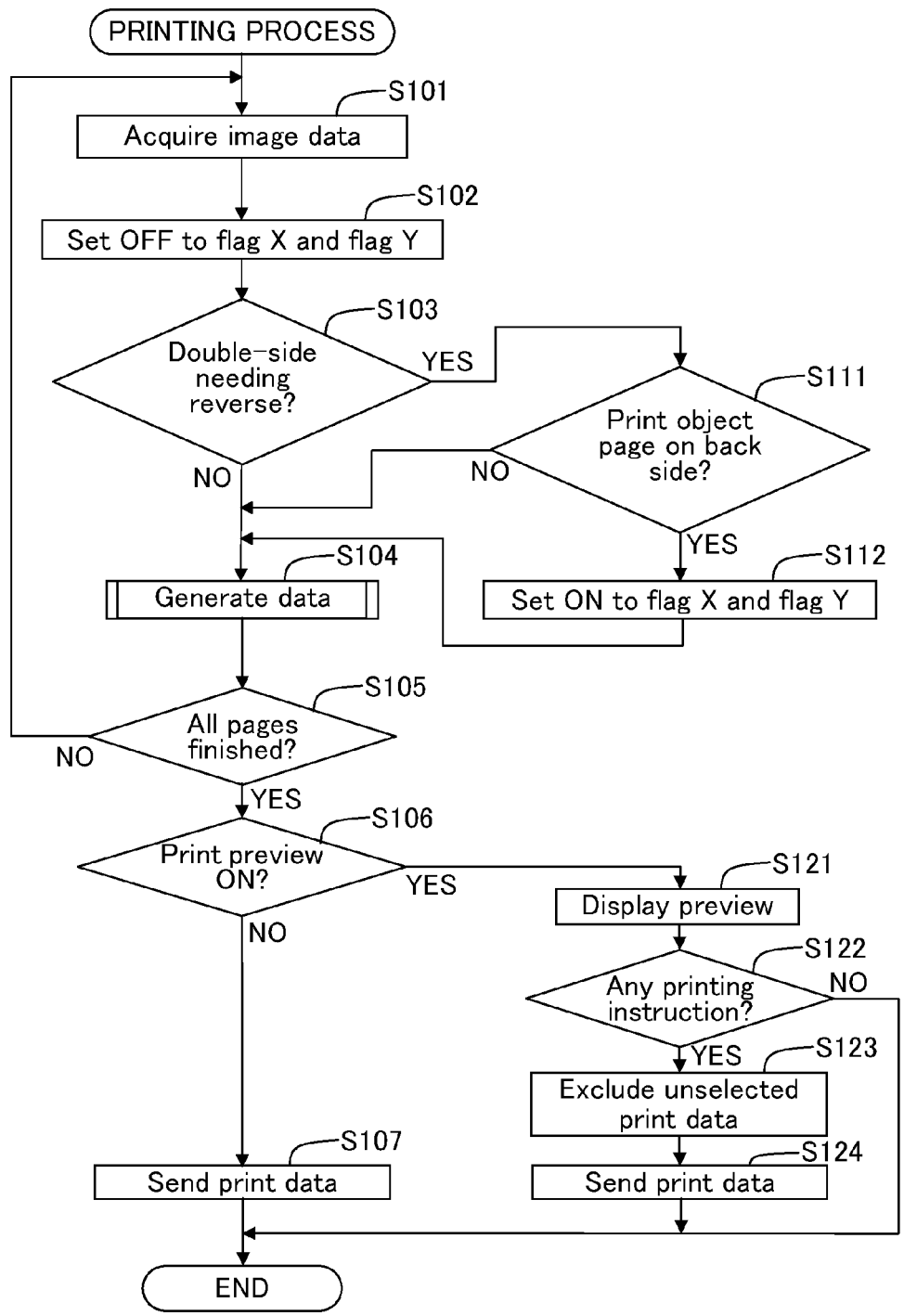
FIG. 9 is a flowchart showing a procedure of a printing process of a printer driver with a first configuration.

Next, referring to the flowchart of FIG. 9, explanations will be given about a printing process of the PC 1 to realize the aforementioned printing procedure. FIG. 9 shows a procedure which is realized by the PC 1 using the printer driver 40 and OS 50, and is carried out by the CPU 11 in the wake of starting acceptance of the image data as print object via the application programs 61.

In the printing process, first, the image data is acquired from the application programs 61 by one page at a time (step S101: an example of the acquisition process). In the following explanations, step S101 will be simply denoted as S101. Other steps will also be denoted in the same manner. In particular, in S101, the GDI 51 converts the image data acquired by the OS 50 from the application programs 61 into a bitmap data (also referred to as BMP data), and turns over the converted BMP data to the printer graphics driver 43 of the printer driver 40. In other words, in S101, the printer driver 40 acquires the BMP data of the image as print object.

Next, it is configured to set OFF to flag X and flag Y which determine whether or not image reverse is needed (S102). Flag X denotes whether or not image reverse is needed in the width direction, while flag Y denotes whether or not image reverse is needed in the height direction. By carrying out reversing in the width direction and reversing in the height direction, it is possible to rotate the image by 180 degrees. Flag X and flag Y each have an ON status meaning that image reverse is needed, and an OFF status meaning that image reverse is not needed. The printer graphics driver 43 has such flag X and flag Y.

Next, it is determined whether or not double-side printing is set, which needs image reverse (S103). Whether or not the image reverse is needed is determined by the setting contents of binding edge and printing direction as shown in FIG. 6.

When the double-side printing needing the image reverse is set (S103: YES), then it is determined whether or not the print target page is a page to be printed on the back side of the printing paper (S111). In the printer 2, even-numbered pages are those to be printed on the back sides. When it is a page to be printed on the back side (S111: YES), then because image reverse is needed, flag X and flag Y are changed to ON (S112). When it is a page to be printed on the front side (S111: NO), then because image reverse is not needed, flag X and flag Y are not changed.

After S112, or when it is a page to be printed on the front side (S111: NO), or when the double-side printing needing the reverse is not set (S103: NO), a data generation process is carried out for the printer graphics driver 43 to generate the print data and the preview data (S104).

Figure 10:
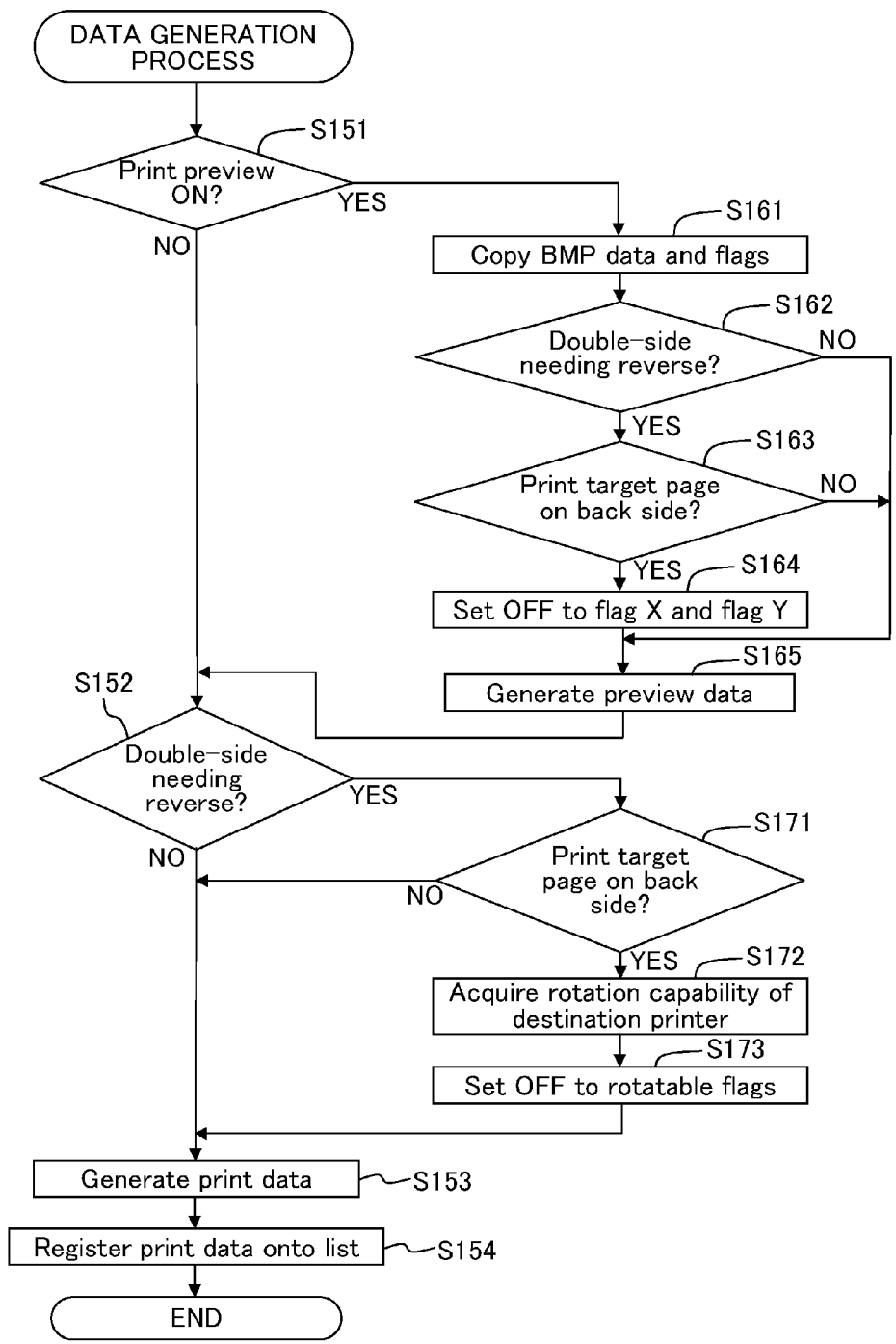
FIG. 10 is a flowchart showing a procedure of a data generation process of the printer driver with the first configuration.

FIG. 10 shows a detailed procedure of the data generation process of S104. In the data generation process, first, it is determined whether or not the setting for displaying the print preview is ON (S151). When the setting for displaying the print preview is OFF (S151: NO), that is, when preview display is not carried out, then the process proceeds to S152 without generating the preview data.

When the setting for displaying the print preview is ON (S151: YES), then the BMP data acquired in S101, and the present status of flag X and flag Y are copied for generating the preview data (S161).

After S161, it is determined whether or not the double-side printing needing the reverse is set (S162). When the double-side printing needing the reverse is set (S162: YES), then it is determined whether or not the print target page is a page to be printed on the back side of the printing paper (S163). For a page to be printed on the back side, the print data of the reverse image is generated. Therefore, when the preview data is similarly made from the reverse image, then it is difficult for the user to recognize the printing result. Hence, when it is a page to be printed on the back side (S163: YES), then flag X and flag Y copied in S161 are changed to OFF (S164). That is, each flag is returned to its original status. On the other hand, for a page to be printed on the front side, the print data of the non-reverse image is generated. Therefore, flag X and flag Y copied in S161 are not changed.

After S164, or when it is a page to be printed on the front side (S163: NO), or when the double-side printing needing the reverse is not set (S162: NO), according to flag X and flag Y copied in S161, the preview data is generated from the BMP data copied in S161 (S165: an example of the preview data generation process).

After S165, or when the setting for displaying the print preview is OFF (S151: NO), it is determined whether or not the double-side printing needing the reverse is set (S152). When the double-side printing needing the reverse is set (S152: YES), then it is determined whether or not the print target page is a page to be printed on the back side of the printing paper (S171).

While it is necessary to rotate the image data of a page to be printed on the back side by 180 degrees, the PC 1 does not need to carry out the whole rotation process. That is, when part of the rotation process is performable by the printer 2, then because the process by the printer 2 is faster than the process by the PC 1, it is preferable to let the printer 2 perform part of the rotation process.

Then, when it is a page to be printed on the back side, that is, when it is a page needing image reverse (S171: YES), then the capability of performing the rotation process of the destination printer to which the print data is sent is acquired (S172). In this embodiment, the destination printer corresponds to the printer 2. In this embodiment, it is configured to acquire both the capability for the rotation process of the image in the width direction, and the capability for the rotation process of the image in the height direction. About the capability of performing the rotation process, it is possible to make a direct inquiry to the destination printer. Or, when the printer driver 40 has a database storing the performance capability according to each printer model, it is also possible to refer to that database.

After S172, other flags, which correspond to the rotation process performable by the destination printer which corresponds to the printer 2 in this embodiment are changed to OFF (S173). That is, the destination printer is caused to perform the rotation process performable by the destination printer, so as to exempt the PC 1 from performing the same. Further, the flags changed in S173 are original flags different from the flags copied in S161.

After S173, or when it is a page to be printed on the front side (S171: NO), or when the double-side printing needing the reverse is not set (S152: NO), according to original flag X and flag Y, the print data is generated from original BMP data (S153: an example of the print data generation process).

By virtue of this, for example, when the printer 2 does not have the capability of rotation process, and when portrait print with long-edge binding is set as the setting for the double-side printing, then the print data is based on the image data after being reversed by 180 degrees. Further, for example, when the printer 2 has the capability of rotation process for an image in the width direction but does not have the capability of rotation process for the image in the height direction, and when portrait print with long-edge binding is set as the setting for the double-side printing, then the print data is based on the image data of the image reversed only in the height direction.

After S153, the generated print data is registered onto a data transmission list storing the transmission order (S154). Further, at the point of S154, the print data is not sent. After S154, the data generation process is ended.

To return to the explanation of FIG. 9, after finishing the data generation process of S104, it is determined whether or not the process is finished with all the pages (S105). When the process is not yet finished with all the pages (S105: NO), then after returning to S101, the process from S101 is repeated for the unprocessed pages.

When the process is finished with all the pages (S105: YES), then it is determined whether or not the setting for displaying the print preview is ON (S106). When the setting for displaying the print preview is ON (S106: YES), then the previewer 42 is activated to display the preview data generated in S104 on the preview screen 420 (S121: an example of the display process).

After S121, it is determined whether or not the printing instruction is received from the user, that is, whether or not the print execution button 423 of the preview screen 420 has been pressed (S122). When the printing instruction is not received from the user, but the cancel button 424 has been pressed (S122: NO), then the printing process is ended. When the printing instruction is received from the user (S122: YES), then the previewer 42 is ended with excluding the print data not selected as print object from the data transmission list (S123).

After S123, the printer driver 40 sends the print data registered on the data transmission list to the printer 2 page by page according to the registered order (S124). After completion of sending all the print data, the printing process is ended. Further, when the cancel instruction is received before the printing instruction is received, then the printing process is ended without proceeding to S123.

Further, when the setting for displaying the print preview is OFF (S106: NO), then the printer driver 40 registers the print data registered on the data transmission list into the RAW spool file 52 page by page according to the registered order, and the OS 50 sends the print data registered in the RAW spool file 52 to the printer 2 (S107). After completion of sending all the print data, the printing process is ended.

According to this embodiment, when generating the print data for a reverse image, the preview data is generated based on the image before being reversed, from the process of rechanging and thus restoring the status of flag X and flag Y memorizing whether or not image reverse is needed. For example, as shown in FIGS. 11A to 11C, as to a print job with a four-page manuscript (FIG. 11A) for which the double-side printing needing the reverse is set, the second page and forth page in the print data (FIG. 11B) are reverse images, while all the pages in the preview data (FIG. 11C) are non-reverse images. Thus, because the images before being reversed are displayed on the preview screen 420, it becomes easy for the user to recognize the printing result.

<Printing Process (Second Configuration)>

Figure 12:
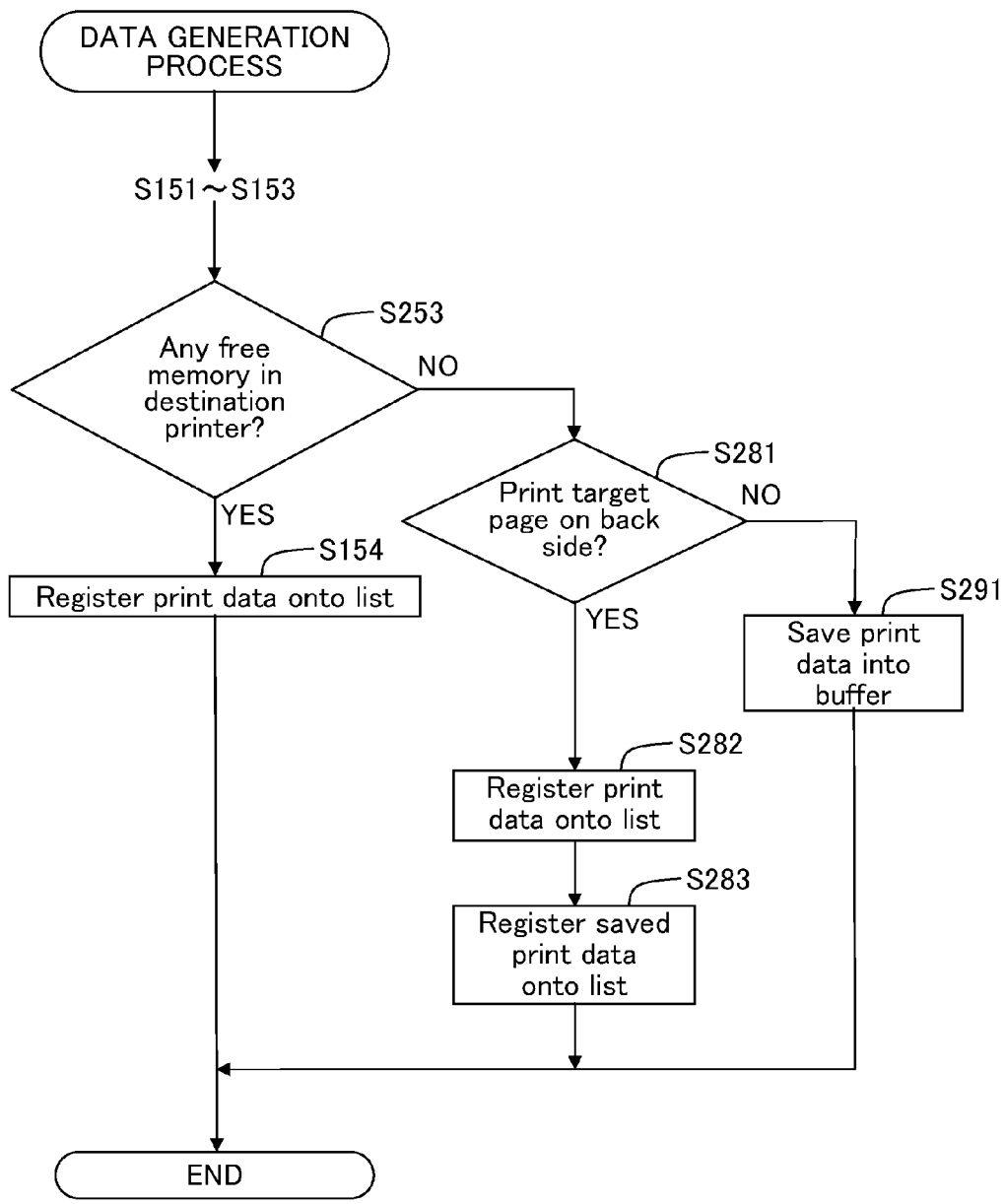
FIG. 12 is a flowchart showing a procedure of a data generation process of the printer driver with a second configuration.

Next, a second configuration of the printing process will be explained. In the second configuration, when free memory space is insufficient in the destination printer, then the print data is sent after changing the order of pages. This is different from the first configuration in which the order of pages is not changed. Further, in particular, in the printing process of the second configuration, the data generation process of S104 is different from that of the first configuration, while other processes are the same as those of the first configuration. Therefore, referring to the flowchart of FIG. 12, the data generation process will be explained. Note that, however, with respect to the data generation process, the same reference numerals are used to refer to the same steps of the second configuration as those of the first configuration, any explanation for which will be omitted.

In the data generation process of the second configuration, the steps up to S153 are the same as those of the first configuration. Then, after generating the print data in S153, it is determined whether or not the free memory space of the destination printer is equal to or more than a predetermined amount (S253). With the printer 2 as the data transmission destination, for example, in order to exchange the printing orders between the odd-numbered pages and the even-numbered pages, when it is intended to exchange the printing orders with the printer 2, then it is necessary for the memory space to be capable of accommodating a two-page print data. Therefore, the predetermined amount of memory space is adapted as capable of accommodating a two-page print data. About the free memory space of the destination printer, it is possible to make a direct inquiry to the destination printer or, because the printer driver 40 has a database storing the maximum value of memory space available according to each printer model, it is also possible to refer to that database. When the free memory space of the destination printer is not less than the predetermined amount (S253: YES), then the step proceeds to S154 to carry out the same process as that of the first configuration.

On the other hand, when the free memory space of the destination printer is less than the predetermined amount (S253: NO), then it is not possible to exchange the printing orders on the printer side. Therefore, it is necessary to exchange the printing orders on the PC 1 side. Hence, it is determined whether or not the print target page is a page to be printed on the back side of the printing paper (S281).

When the print target page is a page to be printed on the front side of the printing paper, that is, a page to be printed later (S281: NO), then the print data to be printed on the front side is not registered onto the data transmission list, but saved temporarily into a buffer (S291). After S291, the data generation process is ended.

On the other hand, when the print target page is a page to be printed on the back side of the printing paper, that is, a page to be printed earlier (S281: YES), then the print data to be printed on the back side is first registered onto the data transmission list (S282). Thereafter, the print data saved in S291 into the buffer for the front side is registered onto the data transmission list (S283). By virtue of this, the transmission orders are exchanged between the print data generated earlier and the print data generated later. For example, when the print data have four pages, then the order of 1, 2, 3, 4 is changed to the order of 2, 1, 4, 3. After S283, the data generation process is ended.

In this manner, when the free memory space of the destination printer is less than the predetermined amount capable of storing the print data of a number of pages needed to exchange the printing orders, then it is possible to exchange the printing orders by letting the PC 1 exchange the transmission orders of the print data. Therefore, it is possible to realize double-side printing even with printers with such a small memory capacity. On the other hand, in previewing, it is preferable to display a preview according to the order of pages, which is closer to the printing result. Hence, without changing the page order of preview data, the display order at the previewer 42 is also not changed.

As explained above in detail, when carrying out double-side printing, the PC 1 of this embodiment determines whether or not to change the direction of image data. Then, when changing the direction of image data, it generates a print data for the image whose direction has been changed. Further, when the print data is generated after changing the direction of the image, then a preview data is generated after rechanging the direction of the image data, which correspond to the status of flag X and flag Y in this embodiment, so as to restore the picture image before being changed. By virtue of this, the image directions are coordinated in preview display. Therefore, it becomes easy for the user to recognize the printing result.

Further, this embodiment is merely an exemplification, and thus by no means limits the present teaching thereto. Therefore, it is possible, as a matter of course, to apply various modifications and changes to the present teaching without departing from its scope and true spirit. For example, the printing apparatus is not limited to a printer, but may also be a photocopy machine, FAX, multifunctional apparatus with printing function, or the like. Further, the information processing apparatus is not limited to a PC, but may also be a workstation, smartphone, PDA, or the like.

Further, while the previewer 42 is included in the printer driver 40 in this embodiment, when the previewer is specialized for displaying preview data, then it need not be a dedicated module to the printer driver 40, but may be a module capable of reading out preview data. For example, when the preview data is a file in bitmap format, then it is also possible to activate a viewer program provided by the OS 50, and cause the viewer program to display the preview data.

Further, while the previewer 42 of this embodiment displays preview data with one page at a time, it may also be configured to enable display of a plurality of pages as a list. Further, it may also be configured to enable an enlarged or diminished display of preview data.

Further, while printing is carried out by the RAW spool method in this embodiment, the present teaching is not limited to this. For example, printing may also be carried out by an EMF spool method, wherein the EMF is an abbreviation of the Enhanced Metafile.

Further, while preview data is supposed to be a bitmap or its compressed file in this embodiment, the present teaching is not limited to this. For example, it may also be an XML file or a PDF file.

Further, in this embodiment, it is configured to first determine whether or not to reverse an image, then let flag X and flag Y store the result, and finally reflect the contents of those flags when generating the preview data or print data. However, the present teaching is not limited to this. That is, it may also be configured to first generate the preview data or print data, then determine whether or not to reverse the image, and finally reverse the content of the preview data or print data according to the determination result.

Further, in this embodiment, it is configured to acquire the capability of the destination printer to perform the rotation process, and any part of the rotation process performable by that printer will not be performed by the printer driver 40. However, regardless of the capability of the destination printer, the printer driver 40 may complete the whole rotation process. In such case, the process of S152 and S171 to S173 is no longer needed. Further, it is also not necessary to distinguish the flags memorizing whether or not to reverse an image between the width direction of the image and the height direction of the image, and thus it is possible to meet the need with one flag.

Further, the processes disclosed in this embodiment may be carried out by hardware devices such as a single CPU, a plurality of CPUs, ASIC, etc., or any combination of these devices. Further, it is possible to realize the processes disclosed in this embodiment by various forms or methods such as a computer readable media having recorded the computer program or programs for carrying out the processes, etc. It is possible to provide the above computer programs in the form of a computer readable media such as CDROM, DVD, Blu-ray Disc, etc., or in the form of a computer readable media such as hard disk, memory disk system, etc. which is installed in a computer such as a server computer, a client computer or the like.

Further, each of the computer programs may be constructed of either one program module or a plurality of program modules.

What is claimed is:

1. A non-transitory computer readable medium storing a program for a computer of an information processing apparatus, the program being configured to cause the computer of the information processing apparatus to carry out:
   acquiring image data as a print object, the image data including a plurality of pages oriented in an original direction;
   receiving a selection for double-sided printing, wherein the double-sided printing selection further includes one of a long-edge binding, portrait print setting and a short-edge binding, landscape print setting;

based on the double-sided printing selection, generating print data from the acquired image data, wherein the generated print data includes one or more pages of the image data having the original direction and one or more pages of the image data having a changed direction, wherein the original direction represents image data that is unchanged in direction and the changed direction represents image data that is reversed in direction;

generating preview data from the generated print data without changing orientations of the pages in the generated print data, wherein the preview data comprises data having a restored direction relative to the changed direction image data in the generated print data to provide a visual preview including each of the plurality of pages of the image data oriented in the original direction; and displaying the generated preview data on the information processing apparatus with each of the plurality of pages oriented in the original direction;

wherein when generating the print data, capability information indicating a rotation processing capability of a printing apparatus as destination to which the print data is sent is acquired, and based on the capability information, the direction of the image data is changed by carrying out a rotation not performable by the printing apparatus but the direction of the image data is not changed by skipping a rotation performable by the printing apparatus, with respect to rotations of the image data in a width direction and a height direction thereof.

2. The non-transitory computer readable medium according to claim 1, wherein when generating the print data, it is determined to change the direction of the image data to be printed on one side of a sheet of printing paper but not change the direction of the image data to be printed on the other side of the sheet of printing paper, based on the double-side print setting; and when generating the preview data, the preview data is generated after restoring the direction of the image data to be printed on the one side to an original direction before being changed.

3. The non-transitory computer readable medium according to claim 1, wherein the program further causes the computer of the information processing apparatus to carry out changing an order of sending the print data to a printing apparatus from a page order to a print order, in a case that a predetermined amount exceeds the free space size of a memory device storing the print data, of the printing apparatus as destination to which the print data is sent, and when displaying the generated preview data, the preview data is displayed in the page order.

4. An information processing apparatus comprising:
a display; and
a controller which is configured to:
acquire image data as a print object, the image data including a plurality of pages oriented in an original direction;

receive a selection for double-sided printing, wherein the double-sided printing selection further includes one of a long-edge binding, portrait print setting and a short-edge binding, landscape print setting;

based on the double-sided printing selection, generate print data from the acquired image data, wherein the generated print data includes one or more pages of the image data having the original direction and one or more pages of the image data having a changed direction, wherein the original direction represents image data that is unchanged in direction and the changed direction represents image data that is reversed in direction;

generate preview data from the generated print data without changing orientations of the pages in the generated print data, wherein the preview data comprises data having a restored direction relative to the changed direction image data in the generated print data to provide a visual preview including each of the plurality of pages of the image data oriented in the original direction; and display the generated preview data on the display with each of the plurality of pages oriented in the original direction;

wherein when generating the print data, the controller is configured to acquire capability information indicating a rotation processing capability of a printing apparatus as destination to which the print data is sent, and based on the capability information, the controller is configured to change the direction of the image data by carrying out a rotation not performable by the printing apparatus but the direction of the image data is not changed by skipping a rotation performable by the printing apparatus, with respect to rotations of the image data in a width direction and a height direction thereof.

5. The information processing apparatus according to claim 4, wherein when generating the print data, the controller is configured to determine to change the direction of the image data to be printed on one side of a sheet of printing paper but not change the direction of the image data to be printed on the other side of the sheet of printing paper, based on the double-side print setting; and when generating the preview data, the controller is configured to generate the preview data after restoring the direction of the image data to be printed on the one side to an original direction before being changed.

6. The information processing apparatus according to claim 4, wherein the controller is configured to carry out changing an order of sending the print data to a printing apparatus from a page order to a print order, in a case that a predetermined amount exceeds the free space size of a memory device storing the print data, of the printing apparatus as destination to which the print data is sent, and when displaying the generated preview data, the controller is configured to display the preview data in the page order.

* * * * *